United States Patent
Thrasher et al.

(10) Patent No.: US 6,174,067 B1
(45) Date of Patent: Jan. 16, 2001

(54) LIGHTING SYSTEM, APPARATUS, AND METHOD

(75) Inventors: Larry E. Thrasher, Camarillo; Mihail V. Mateescu, Los Angeles; Michael F. Paul, Camarillo, all of CA (US)

(73) Assignee: PacFab, Inc., Moorpark, CA (US)

( * ) Notice: Under 35 U.S.C. 154(b), the term of this patent shall be extended for 0 days.

(21) Appl. No.: 09/064,046

(22) Filed: Apr. 21, 1998

(51) Int. Cl.[7] ................................................ F21V 33/00
(52) U.S. Cl. ......................... 362/101; 362/267; 362/364
(58) Field of Search .................................. 362/101, 267, 362/364, 365, 368, 374, 375; 315/276, 282, 291; 174/505, 50.52, 52.1

(56) References Cited

U.S. PATENT DOCUMENTS

| | | | |
|---|---|---|---|
| 3,651,321 | 3/1972 | Magi et al. | 362/455 |
| 3,721,865 | 3/1973 | Rademaker et al. | 174/52.1 |
| 3,801,022 | 4/1974 | Cassey . | |
| 3,949,213 | 4/1976 | Paitchell | 362/101 |
| 4,296,454 | 10/1981 | Wong | 174/52.1 |
| 4,539,629 | 9/1985 | Poppenheimer | 362/267 |
| 4,544,996 | 10/1985 | George | 362/267 |
| 4,847,536 | 7/1989 | Lowe et al. | 315/282 |
| 4,862,335 | 8/1989 | Vadseth | 362/247 |
| 5,045,978 | 9/1991 | Gargle | 362/101 |
| 5,051,875 | 9/1991 | Johnson | 362/101 |
| 5,089,751 | 2/1992 | Wong et al. | 315/279 |
| 5,130,916 | 7/1992 | Toth | 362/101 |
| 5,169,228 | 12/1992 | Breitzler | 362/293 |
| 5,264,997 | 11/1993 | Hutchison et al. | 362/226 |
| 5,349,505 | 9/1994 | Poppenheimer | 362/101 |
| 5,375,046 | 12/1994 | Narumi et al. | 362/226 |
| 5,408,397 | 4/1995 | Tyson | 362/267 |
| 5,432,688 | 7/1995 | Tobias et al. | 362/101 |
| 5,489,825 | 2/1996 | Rimmer | 315/276 |
| 5,556,188 | 9/1996 | Poppenheimer | 362/101 |
| 5,842,771 | 12/1998 | Trasher et al. | 362/101 |
| 5,907,223 | 5/1999 | Gu et al. | 315/307 |
| 5,908,236 | 6/1999 | Lueken et al. | 362/364 |
| 5,936,359 | 8/1999 | Gibson | 315/276 |

FOREIGN PATENT DOCUMENTS

| | | | |
|---|---|---|---|
| 10060 | 11/1954 | (DE) | 362/374 |
| 1093386 | 11/1954 | (FR) | 362/374 |
| 2021749 | 12/1979 | (GB) . | |

OTHER PUBLICATIONS

Understanding Fiber Optics, Second Edition, 1993, Jeff Hecht, pp. 235–236.

B plus L Technologies LTD Technical Bulletin for Electronic Converters for Halogen Lamps, date and author unknown.

Schematic diagram of B plus L Technologies 150W Electronic Converter as drawn by Mihail V. Matesscu, date of first sale unknown.

U.S. Patent Application No. 08/552,559 filed Nov. 3, 1995.

Primary Examiner—Thomas M. Sember
Assistant Examiner—Peggy A. Neils
(74) Attorney, Agent, or Firm—Pretty & Schroeder, P.C.

(57) ABSTRACT

A lighting system (100) comprises a nonconductive niche (110) that is free of ground connections and bond connections, and a lighting fixture (108) having no conductive components, except for a current-carrying circuit (112). Snap fasteners (124) secure the lighting fixture to the niche, and lamp sockets are arranged to radiate multiple light beams from halogen lamps in different directions. An electronic isolation transformer (200), which supplies a two-wire, ungrounded source of power to the halogen lamps, presents a linear load and a conduction path to a dimmer switch, and inhibits switching in the electronic isolation transformer when an AC signal (204) applied to the electronic isolation transformer is within a predetermined range. A nonconductive junction box (600) houses the electronic isolation transformer and physically isolates a high-voltage, low-frequency power source (106) from the low-voltage, high-frequency power source in the junction box.

2 Claims, 4 Drawing Sheets

LIGHTING SYSTEM, APPARATUS, AND METHOD

FIELD OF THE INVENTION

The present invention relates generally to the fields of lighting systems, and, more particularly, to a lighting system for underwater lighting, apparatus, and method therefore. Although the invention is subject to a wide range of applications, it is especially suited for lighting a pool or a whirlpool bath, and will be particularly described in that connection.

BACKGROUND OF THE INVENTION

Lighting systems for a pool illuminate the water at night for the safety of swimmers and for aesthetic purposes. The illumination emanates from underwater lights affixed to the wall of the pool. Although the safety of the pool is enhanced in some respects by the underwater lights, the use of electricity to power the underwater lights creates a risk of electrical shock.

Conventional pool lighting systems typically utilize a household 110-volt (V), 60-Hertz (Hz), alternating-current (AC), three-wire, grounded source of power to supply electrical power to the underwater lights. A cord conducts the electrical power to the underwater lights. In particular, a cord having three wires has one end terminated at a metallic electrical panel, which is coupled to the household electrical power and located at a relatively far distance from the pool near the residence. The cord runs from the electrical panel to a metallic (or nonmetallic) junction box located near the pool. The metallic junction box houses the connection point for the cord to another three-wire cord that leads to the underwater light. The another cord runs from the junction box to the underwater lights. The cords typically run underground through conduit that protects the cord from damage.

Two of the three wires are a "hot" wire and a "neutral" wire that conduct the electrical power to the underwater lights. The household source of power impresses a voltage between the hot wire and the neutral wire to cause an electrical current to flow through the hot wire, the underwater lights, and the neutral wire. In simple terms, the hot wire carries the electrical current from the electrical panel to the underwater lights, and the neutral wire provides a path for the electrical current to return to the electrical panel. The voltage drop due to the current flowing in the wires is typically small compared to the 110-V source, thus a sufficient voltage exists at the pool lights to power them.

A "ground fault" occurs when electrical current strays from the hot wire, the neutral wire, or other current-carrying component of the underwater light, to an electrically conductive component. The conductive component becomes energized, thus causing a risk of electrical shock to a person who may come in contact with it.

The risk of electrical shock due to ground faults can be reduced by several measures.

A "ground" wire is a safety feature of the three-wire, grounded electrical system, providing another path for electrical current to return to the electrical panel. The third wire of the cord is the ground wire. Typically, the electrically conductive components of the underwater light, other than those components that are meant to carry electrical current to the underwater light, are connected to the ground wire. For example, a metallic housing or light reflector in the lighting fixture is "grounded," that is, an electrical connection is made from the housing or reflector to the ground wire. By grounding the conductive component, the stray electrical current can return to the electrical panel by way of the return path provided by the ground wire. Thus, the grounded conductive component is de-energized, reducing the risk of electrical shock.

As an extra safety precaution, the conductive component is "bonded," that is, an electrical connection is made to a conductive net encircling the pool. The conductive net is typically the reinforcing steel bar of the concrete pool walls. Thus, the electrical current can dissipate via the earth.

The risk of electrical shock depends primarily upon the integrity of the grounding and bonding of the lighting system. The integrity of the grounding and bonding can be compromised for various reasons: The ground and bond connections may not be made during the installation of the pool lights; the ground and bond connections can deteriorate due to corrosion; and, the ground connections can be damaged, for example, by a person servicing the light, earthquake tremors, construction, lightning, or rodents. To increase safety due to deterioration and damage, multiple grounds and bonds are made to the conductive components. This redundancy, however, increases the installation costs of the pool lights.

Even if the integrity of the grounding and bonding remains intact, the risk of electrical shock can arise from another source. Because the pool light shares the same ground as the utility service and household electrical system, ground faults from household appliances can be conducted through the ground wire and energize the conductive components of the pool light.

Lighting systems are known that utilize an isolation transformer for supplying a 110-V, 60-Hz, three-wire, grounded source of power to the pool light. The isolation transformer is typically housed in a separate independent electrical enclosure. The isolation transformer isolates the hot wire and the neutral wire of the primary from the output wires of the secondary. These systems do not, however, isolate the ground wire. Thus, ground faults can propagate across the transformer.

Lighting systems are known that utilize an isolation transformer for supplying a two-wire, ungrounded source of power to the pool light. The niches used in these two-wire systems, however, are designed to receive lighting fixtures that are powered by both the three-wire, grounded source of power and the two-wire, ungrounded source of power. For safety, such a niche must have connections for grounding and bonding, and the niche must be bonded to the pool net during installation, to guard against the possibility that a three-wire lighting fixture, or a two-wire lighting fixture having conductive components, will be installed in the niche during the life of the niche.

Typically, a metallic bolt fastens the three-wire or two-wire lighting fixture to the niche, and the bolt can be removed to unfasten the lighting fixture for service or replacement. Furthermore, the bolt is one of various bonding connections that provide an electrically conductive path from the conductive components of the lighting fixture and the niche to the pool net.

Accordingly, not much labor cost is saved in the installation of pool lighting systems when a two-wire, ungrounded source of power is used to power the lighting fixture because of the requirement for grounding connections and bonding connections.

A need therefore exists for a lighting system, which uses a two-wire lighting fixture supplied by a two-wire, ungrounded source of power, that is easier to install than conventional lighting systems without compromising the safety of the lighting system.

Not only safety features but also aesthetic features of the lighting system are important to purchasers of underwater lighting systems.

Conventional pool lighting fixtures employ a single lamp. Thus, to adequately illuminate the underwater area, multiple pool lights are typically arranged around the pool walls to obtain wide coverage of illumination. Even with the scattering of lights, areas along the walls, especially in corners, remain dimly lit because the conventional lighting fixtures are highly directional and project the light forward from the pool wall. Thus, it would be desirable to have a pool lighting fixture that could widely disperse the emanating light.

The single lamp used in pool lighting fixtures is typically an incandescent lamp, although halogen lamps are coming into use. A halogen lamp provides a high-intensity natural white light at about two-thirds the energy consumption of a conventional incandescent lamp at the same illumination. Because of the advantages of the halogen lamp, it would be desirable to employ a halogen lamp in the pool lighting fixture. It is further desireable to use a low-voltage lamp to reduce the risk of shock. Typically, the low voltage is supplied by a transformer. Because of the low voltage, the isolation transformer needs to be located near the lamp to reduce the voltage drop across the wires conducting power to the lamp. Thus, it is not desirable to use low-voltage lamps in pool lights when the isolation transformer is in an electrical panel that is far away from the pool.

Another desirable aesthetic feature of a lighting system is to adjust the intensity of the illumination emanated by the lights. Lighting systems are known that use manually operated (MO) dimmer switches for varying the intensity of the lights. MO dimmer switches are installed on the power line leading to the light, and typically have a rotatable knob that adjusts the intensity of the lights. The combination of a MO dimmer switch and an electronic transformer operates satisfactorily when the connected load is close to the power rating of the electronic transformer. The combination may fail to operate, however, when the load is much lower than the maximum power rating of the electronic transformer.

Lighting systems are also known that use inexpensive two-wire, remote-controlled (RC) dimmer switches, such as, a line of X10 dimmer switches available from Home Automation Systems, Inc.

In one application, a hand-held remote unit is operated by the user, and, in response, the remote unit transmits a radio-frequency (RF) signal of 121 kilohertz to a control unit. The control unit, in response to the RF signal, adjusts the intensity of the light. The RC dimmer switch in this application, however, is specified to be used only with incandescent lamps, because the RC dimmer switch relies upon the conduction path through the incandescent bulb filament for communication. Accordingly, these inexpensive, two-wire RC dimmer switches are not suitable for other types of lamps that interrupt the conduction path.

In another application, a hand-held remote unit is operated by the user, and, in response, the remote unit transmits a radio-frequency (RF) signal to a transceiver unit. The transceiver unit is plugged into a household power outlet within the communication range of the remote unit. The transceiver unit receives the RF signal from the remote unit, and, in response to the RF signal and a zero crossing of the AC signal on the power lines, transmits a dimming control signal over the power lines. The control unit synchronizes its reception of the dimming control signal based on the zero crossing and, in response to the received dimming control signal, adjusts the intensity of the light.

The communication between the transceiver unit and control unit is dependent upon the timing derived from the zero crossing of the AC signal. Nonlinear loads that generate noise on the power line, however, can interfere with the timing of the reception of the dimming control signal. An example of a nonlinear load is a load that has switching occurring in it, such as, electronic transformer model no. CV 10/75-12 available from B plus L Technologies, Ltd.

Furthermore, the noise generated by a nonlinear load can interfere with the dimming control signal. Conventional techniques to reduce the interference are to install isolation devices or noise reducing devices that filter out the noise. These techniques, however, are relatively expensive, requiring the purchase and installation of the devices.

Thus, these inexpensive, two-wire RC dimmer switches are suitable for use in applications where the connected load is linear, but are not suitable for applications where the connected load is nonlinear, such as, halogen lamps powered by an electronic isolation transformer.

A need therefore exists for an underwater lighting system that is easier to install, has improved illumination characteristics, and can employ MO switches and inexpensive RC dimmer switches, without compromising safety.

SUMMARY OF THE INVENTION

The present invention, which tends to address these needs, resides in a lighting system, apparatus, and method therefore. The lighting system described herein provides advantages over conventional lighting systems that provide a two-wire, ungrounded source of power to a two-wire lighting fixture in that installation is easier, illumination characteristics are improved, and MO switches and inexpensive RC dimmer switches can be employed to dim the pool lights.

According to the present invention, eliminating ground connections and bond connections from the pool light. This is accomplished by forming a niche and a lighting fixture entirely of nonconductive material, except for a current-carrying circuit. Thus, there are no conductive components that can be energized upon occurrence of a ground fault in the lighting fixture, and, consequently, no requirement for ground connections, bond connections, and their coupling to the pool net. Furthermore, there is no risk of shock due to deterioration, damage, or improper installation of the grounds and bonds.

Also according to the present invention, eliminating cumbersome fasteners, such as, bolts, from the pool light. This is accomplished by securing the lighting fixture to the niche by at least one snap fastener. The snap fastener simplifies installing the lighting fixture to the niche. Furthermore, conventional pool lighting fixtures are not known to employ such a snap fastener. Thus, conventional pool lighting fixtures, some of which having conductive elements or are of the three-wire variety, cannot be installed in the niche that is free of ground connections and bond connections.

In one aspect of the present invention, forming the snap fastener and lens as an integral one-piece unit.

In further accordance with the present invention, widely dispersing illumination from a single lighting fixture. This is accomplished by a first socket arranged to receive a first lamp so that a main beam of the first lamp radiates in a first direction, and a second socket is arranged to receive a second lamp so that a main beam of the second lamp radiates in a second direction. Thus, dimly lit areas of the pool are reduced without an increase in the number of pool lights.

In one aspect of the present invention, a housing of the lighting fixture has opposing sides that angle outwardly from a closed rear portion to an open front portion of the housing, and the first socket is affixed to either the rear portion or the one of the sides, and the second socket is affixed to the other side.

In a detailed aspect of the present invention, a one socket mount projects forward either from the rear portion or the one of the sides, another socket mount projects from the other side, and the socket mounts and housing are formed as an integral one-piece unit Moreover, according to the present invention, powering the lighting fixture with a two-wire, ungrounded source of power at a frequency greater than the frequency of the household source of power. This is accomplished by an electronic isolation transformer that converts a three-wire, grounded source of power at a first frequency to a two-wire, ungrounded source of power at a second frequency that is greater than the first frequency. The higher frequency reduces the likelihood of serious electrical shock in the unlikely event that the current-carrying circuit would come into contact with the pool water, a swimmer, or a repairman.

In one aspect of the present invention, presenting a linear load to a MO dimmer switch coupled to the electronic isolation transformer, and providing a conduction path for an RC dimmer switch. This is accomplished by a linear-load circuit that couples itself across the input of the electronic isolation transformer when an AC signal applied to the input of the electronic isolation transformer is within a predetermined range and uncouples itself otherwise.

In particular, the electronic isolation transformer includes a rectifier circuit, having an input and an output, that rectifies the AC signal having a first frequency to produce a rectified signal at the output. The linear-load circuit responds to the AC signal to couple itself across the input of the rectifier circuit when the AC signal is within the predetermined range and to uncouple itself otherwise. The linear load is chosen to be within the power rating of the dimmer switch. Accordingly, the electronic isolation transformer provides the lighting system with the flexibility to employ MO dimmer switches specified to be used within a rated load and RC dimmer switches that require a conduction path for communication.

In a detailed aspect of the present invention, inhibiting switching in the electronic isolation transformer when the RC dimmer switch communicates. This is accomplished by the linear load circuit further responding to the AC signal to provide a first control signal, and an oscillator circuit of the electronic isolation transformer that responds to the first control signal to inhibit switching when the AC signal is within the predetermined range and to permit switching otherwise. The predetermined range is chosen to correspond to at least the time that the RC dimmer switch communicates. Consequently, no high-frequency noise is generated on the power line by the electronic isolation transformer when the RC dimmer switch communicates it dimming control signal. Thus, the electronic isolation transformer provides the lighting system with the flexibility to employ RC dimmer switches that communicate over the power line.

In a more detailed aspect of the invention, dampening an inductor-capacitor (LC) network formed by the RC dimmer switch and the oscillator circuit. This is accomplished by a resistor that is coupled between a one end of the first primary winding and a one end of the second primary winding. This aspect of the invention prevents multiple lamps of the lighting fixture from flickering when one of the lamps burn out.

In another more detailed aspect of the invention, shutting down the electronic isolation transformer when there is no load on the electronic isolation transformer. This is accomplished by a no-load protection circuit that responds to a voltage generated by the oscillator circuit to provide a second control signal to the oscillator circuit that inhibits it from switching when the voltage is greater than a first predetermined threshold and to permit switching otherwise. Accordingly, no output signal is generated when there is no load on the electronic isolation transformer. This aspect of the invention reduces the possibility of electrical shock when a single burned-out lamp is serviced, and allows the electronic isolation transformer to be reset without replacing parts.

In still another detailed aspect of the invention, shutting down the electronic isolation transformer when there is short circuit on the load side of the electronic isolation transformer. This is accomplished by a short-circuit protection circuit that responds to a current flowing in a one of the first primary winding and a second primary winding of the electronic isolation transformer to provide a third control signal to the oscillator circuit that inhibits it from switching when the current is greater than a second predetermined threshold and to permit switching otherwise. Accordingly, no output signal is generated when there is a short-circuit across the output of the electronic isolation transformer. This aspect of the invention reduce the possibility of electrical shock and damage to the electronic isolation transformer components due to shorts, and allows the electronic isolation transformer to be reset without having to replace parts, such as, fuses, which are typically used for short-circuit protection.

In further accordance with the invention, powering the lighting fixture with a low-voltage source of power This is accomplished by housing the electronic isolation transformer in a junction box near the pool. In particular, the junction box that has three separate, adjacent, integrally formed compartments. The three compartments are arranged as a first compartment, a second compartment, and a third compartment between the first compartment and the second compartment. The third compartment is configured to house the electronic isolation transformer. Because the electronic isolation transformer can be located near the pool, the run from the junction box to the lamp will be short, and the voltage drop across the wires will be small, making it feasible to power the lamps with a low-voltage source of power. The low voltage further reduces the likelihood of serious electrical shock.

In accordance with the method of this invention, improving communications of a dimmer switch coupled to a nonlinear load by coupling a linear load across the input of the nonlinear load when an AC signal applied to the nonlinear load is within the predetermined range and uncoupling it otherwise. Thus, a linear load and a conduction path is presented to the dimmer switch when the AC signal is within the predetermined range.

The method more particularly comprises the steps of rectifying the AC signal, switching the rectified AC signal to generate a high-frequency signal at the output of the nonlinear load, and inhibiting switching when the AC signal is within the predetermined range and permitting switching otherwise. Thus, switching noise is not generated when the AC signal is within the predetermined range.

Other features and advantages of the present invention will be set forth in part in the description which follows and accompanying drawings, wherein the preferred embodiments of the invention are described and shown, and in part become apparent to those skilled in the art upon examination of the following detailed description taken in conjunction with the accompanying drawings, or may be learned by practice of the invention. The advantages of the invention may be realized and attained by means of the instrumentalities and combinations particularly pointed out in the appended claims.

DETAILED DESCRIPTION OF THE PREFERRED EMBODIMENTS

Figure 1:
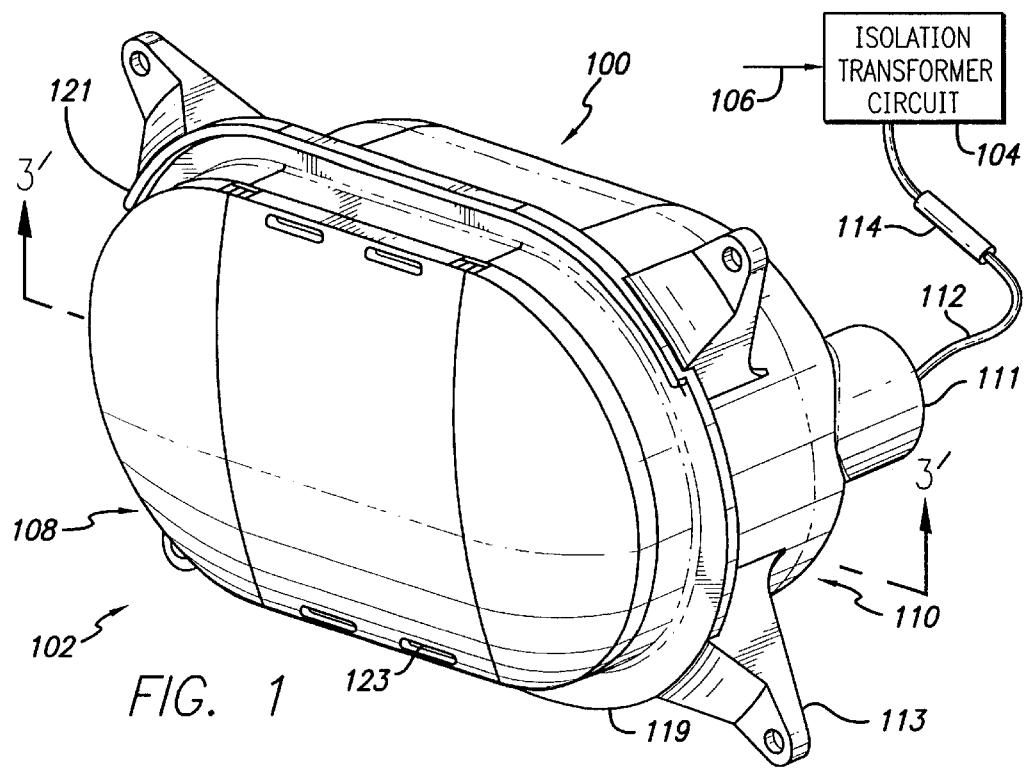
FIG. 1 is a general diagram of a lighting system configured according to the invention, particularly illustrating a front, bottom, and left-side perspective view of a pool light.

As shown in the exemplary drawings, and with reference to FIG. 1, which is a general diagram of a lighting system configured according to the invention, particularly illustrating a front, bottom, and left-side perspective view of a pool light, the present invention is embodied in a lighting system 100 including a pool light 102 and an isolation transformer circuit 104. Lighting system 100 further includes a conduit 114 that is configured to house a current-carrying circuit 112 along a run from isolation transformer circuit 104 to pool light 102. Although only a single pool light and isolation transformer circuit are shown, one skilled in the art will appreciate that multiple pool lights and isolation transformer circuits can be employed in the lighting system.

Isolation transformer circuit 104 converts a three-wire, grounded source of power 106 to a two-wire, ungrounded source of power and supplies the two-wire, ungrounded source of power to pool light 102.

Pool light 102 will now be described.

Figure 2:
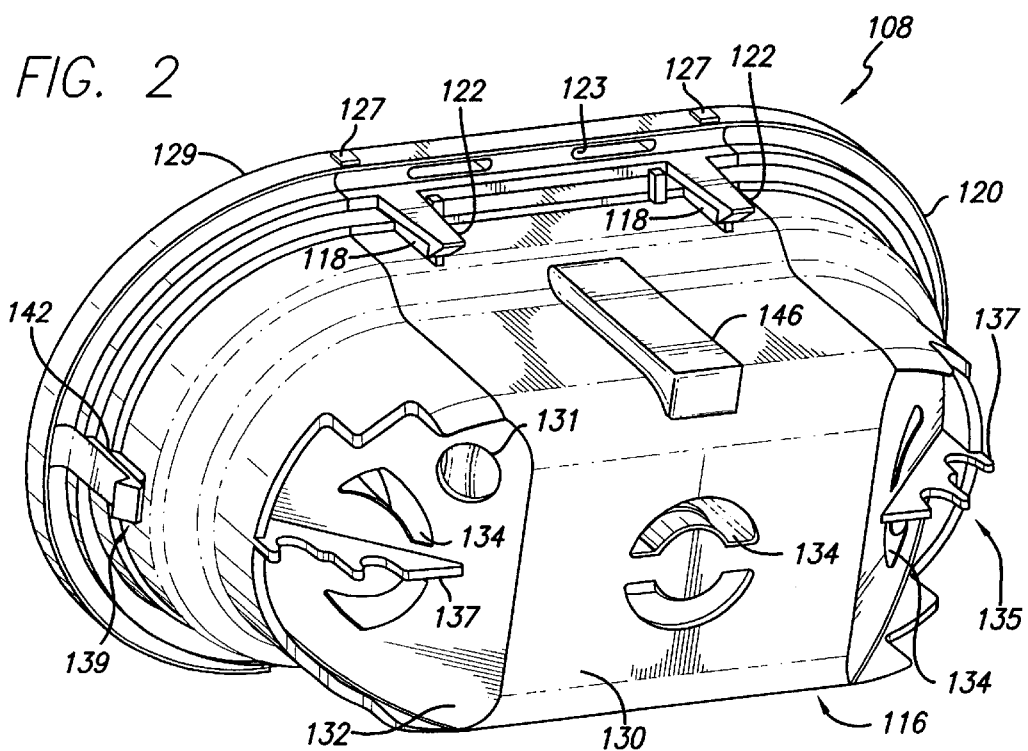
FIG. 2 is a rear, top, and right-side perspective view of the lighting fixture shown in FIG. 1, particularly illustrating a plurality of snap fasteners.

Pool light 102 includes a lighting fixture 108, as further illustrated in FIG. 2, and a niche 110 for receiving lighting fixture 108. During construction of the pool, niche 110 can be mounted to the reinforcing steel bar of a pool by tying off at least one connecting member 113 formed on niche 110. Concrete is poured around the niche to secure the niche to the pool wall, and the niche can be sealed with plaster.

Lighting fixture 108 includes current-carrying circuit 112 that conducts the two-wire, ungrounded source of power to lighting fixture 108 from isolation transformer circuit 104.

Current-carrying circuit 112 includes a two-wire cord that enters niche 110 by way of a tube 111 formed through the rear portion of niche 110, and enters lighting fixture 108 by way of a hole 131 (see FIG. 2) formed through the rear portion of lighting fixture 108. The two-wire cord is threaded through a grommet (not shown) placed inside hole 131, which provide a watertight seal.

In accordance with the present invention, lighting fixture 108 consists of nonconductive material except for current-carrying circuit 112, and niche 110 consists of nonconductive material. Because lighting fixture 108 and niche 110 have no conductive components that can be energized, lighting fixture 108 and niche 110 can be made free of ground connections and bond connections. Thus, the installation of the lighting system is simplified and less expensive because grounding and bonding has been eliminated.

As illustrated in FIG. 2, which is a rear, top, and right-side perspective view of the lighting fixture shown in FIG. 1, lighting fixture 108 further includes a housing 116 having at least one first mounting location 118, and a lens 120 having at least one first snap fastener 122 and at least one second snap fastener 124. First snap fastener 122 is configured to releasably engage the first mounting location 118 to secure lens 120 to housing 116. Second snap fastener 124 is configured to releasably engage a second mounting location on niche 110 to secure lighting fixture 108 to niche 110.

The use of snap fasteners 124 simplifies the installation of lighting fixture 108 to niche 110. According to the present invention, the installer inserts lighting fixture 108 into niche 110 until it snaps into place. Thus, the chores of finding the appropriate bolt and screw driver, lining up the bolt and threaded hole, and screwing the bolt to fasten the lighting fixture to the niche are eliminated. Also, fewer parts are required and the bolt cannot be lost.

Furthermore, the use of snap fasteners 124 to assemble pool light 102 ensures that conventional lighting fixtures of the three-wire variety, or those having conductive elements, will not be installed in nonconductive niche 110 that is free of ground connections and bond connections.

Figure 3:
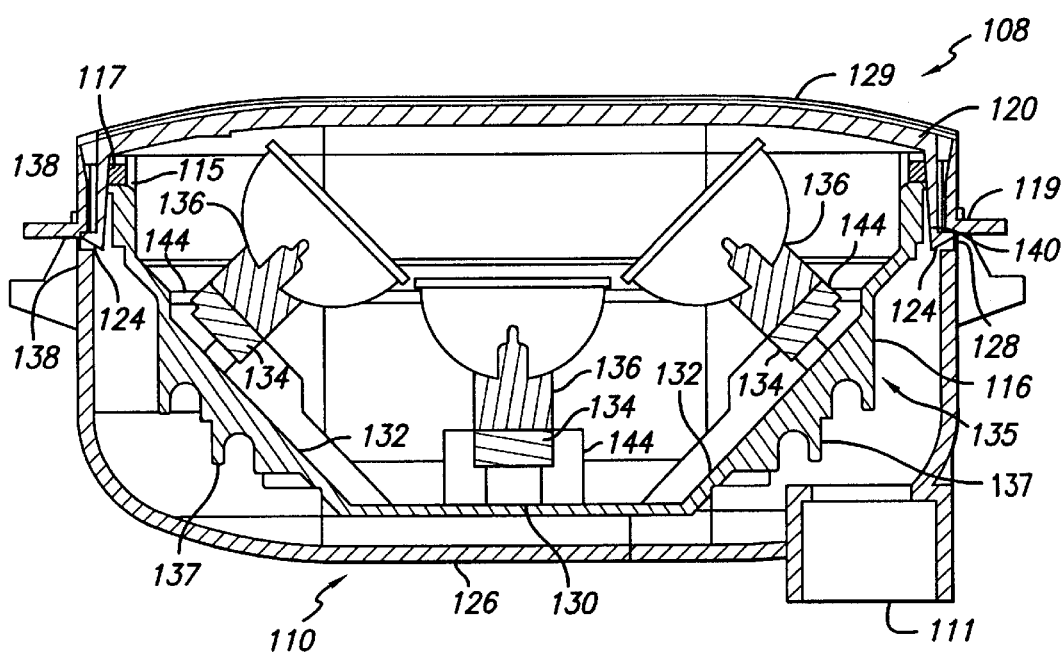
FIG. 3 is a cross-sectional view of the pool light shown in FIG. 1 taken along the plane indicated by broken line 3'—3', particularly illustrating the engagement of the snap fastener illustrated in FIG. 2 and the arrangement of multiple lamps.

In the particular embodiment illustrated in FIG. 3, which is a cross-sectional view of pool light 102 taken along the plane indicated by broken line 3'—3', an O-ring 117 provides a watertight seal between lens 120 and a lip 115 formed on the perimeter of housing 116. O-ring 117 is compressed between lens 120 and lip 115 under the force of first snap fastener 122 engaged to first mounting location 118.

A shade 129 filters the emitted light to provide color to the light. Shade 129 conforms to the shape of lens 120, and snaps onto lens 120 by means of snap fasteners 127 (see FIG. 2).

As shown in FIGS. 1 and 2, apertures 123 in lens 120 and shade 129 allow the passage of pool water over the front face of lens 120 and the outer surface of housing 116. The pool water circulating over lens 120 and housing 116 absorbs the heat generated by the lamps and cools lighting fixture 108. The portion of current-carrying circuit 112 between plugged hole 131 and tube 111 is covered with a watertight jacket to protect it from the pool water.

Referring back to FIG. 3, niche 110 includes a tub-shaped forming shell 126 that has two second mounting locations formed in an inner surface of forming shell 126, in particular, an indentation 128 and an indentation 138. Also, two second snap fasteners 124 each have an elongated member 140,142 extending rearward from the front face of lens 120 toward the inner surface of forming shell 126. Each second snap fastener 124 has a tab at an end of the elongated member distal the front face. The tabs engage indentations 128,138 to secure lighting fixture 108 to niche 110.

For safety, second snap fasteners 124 and the second mounting locations are arranged such that a tool is required to remove lighting fixture 108 from niche 110. Lighting fixture 108 can be removed from niche 110 by inserting a long, thin tool, such as, a flat-head screwdriver, into the gap between the open front portion of niche 110 and the periphery of lens 120 at the location of first elongated member 140 or second elongated member 142. First elongated member 140 and second elongated member 142 can flex towards housing 116 under the pressure of the tool, thus disengaging the tabs from indentations 128,138.

Second snap fasteners 124 and the second mounting locations are arranged such that lighting fixture 108 is properly oriented in niche 110. For example, indentations 128,138 can be disposed at predetermined locations on the inner surface of forming shell 126 and channels leading to the indentations can be of different widths. First elongated member 140 and second elongated member 142 can be of unequal lengths and widths corresponding to the locations of first indentation 128 and second indentation 138 and the widths of the channels. Lighting fixture 108 will be secured to niche 110 when the elongated members, indentations, and channels match. If the lighting fixture is mounted upside down, the elongated member having the greater width would pass over the channel and not snap in place.

Proper orientation is important because a thermostat can be installed inside the top of housing 116, for example, in a well 146 (see FIG. 2) formed in housing 116. The thermostat cuts off the power to the lamps when the interior of lighting fixture 108 exceeds a predetermined set point, usually near the maximum heat rating of any component of the lighting fixture 108. If lighting fixture 108 were installed upside down in niche 110, then the thermostat would be at the bottom of niche 110 and would experience cooler temperatures than if it were at the top when there is a low water condition. If the the thermostat is in the top, it will sense a rise in temperature because the water level has dropped and is no longer cooling the fixture. If the thermostat were in the bottom, it would not sense the rise in temperature to prevent damage to some components of the light. Accordingly, the interior of lighting fixture 108 would exceed the predetermined set point and possibly damage lighting fixture 108.

Referring to FIG. 1, a lip 119 is formed on forming shell 126 to aid in forming a seal between niche 110 and the outer surface of the pool wall to which it is mounted. Lip 119 extends substantially perpendicular to the wall of forming shell 126 and encircles the exterior of forming shell 126 near its opening. A sealant, such as, plaster, is placed between lip 119 and the outer surface of the pool wall to form a watertight seal. Lip 119 includes a flange 121 that spaces lip 119 from the outer surface of the pool wall and holds the plaster in place at the bottom of niche 110. Flange 121 extends forward and perpendicular from the outer edge of the bottom portion of lip 119.

As further illustrated in FIG. 3, housing 116 has an open front portion and a closed rear portion 130. Opposing sides 132 angle outwardly from rear portion 130 to the front portion. At least two sockets 134, which are part of current-carrying circuit 112, can each receive a lamp 136. A first socket 134 is arranged to receive a first lamp 136 so that a main beam of first lamp 136 radiates in a first direction. A second socket 134 is arranged to receive a second lamp 136 so that a main beam of second lamp 136 radiates in a second direction that is not the same direction as the first direction. This configuration provides a wide dispersion of illumination from a single lighting fixture. In this particular embodiment, sockets 134 are affixed to rear portion 130 and on each side 132, so that one beam radiates substantially perpendicular to lens 120 and the other beams radiate at an approximate forty-five degree angle to lens 120.

Sockets 134 are positioned in lighting fixture by socket mounts 144. One socket mount 144 projects forward from rear portion 130 and two other socket mounts 144 project from sides 132. As shown in FIG. 2, socket mounts 134 and housing 116 are an integral one-piece unit formed by a processes such as injection molding. Sockets 134 can be affixed to socket mounts 144 by glue, epoxy, caulk, or the like.

Sockets 134 can be electrically coupled in parallel by running wires along the inner surface of housing 116. A water-resistant material, such as, epoxy or the like, can encapsulate the running wires to further protect them against accidental water leakage into lighting fixture 108. Furthermore, the water-resistant material further seals hole 131.

A rack 135 is formed on the outer surface of sides 132 for securing the excess of the two-wire cord when lighting fixture 108 is installed in niche 110. Rack 135 is part of the one-piece housing 116, and includes two frames with slots formed in them for receiving and securing the excess cord.

In this embodiment, housing 116 consists of a 30% glass-filled polyester, such as, Petra™ 130 FR available from Allied Signal, Inc.; forming shell 126 consists of PVC; lens 120 consists of a transparent polycarbonate material that is resistant to breakage for preventing exposure of current-carrying circuit 104 to pool water, such as, Lexan™ material, available from General Electric, Inc.; sockets 134 are type GX5.3; and lamps 136 are 15-V, 50-W halogens lamps, such as, 2-pin type MR-16.

Isolation transformer circuit 104 will now be described.

Isolation transformer circuit 104 can be a conventional isolation transformer that steps down the voltage of the three-wire, grounded source of power 106 without a conversion of frequency. The low voltage supplied to lighting fixture 108 further reduces the likelihood of serious injury due to electrical shock. Or, isolation transformer circuit 104 can be an electronic isolation transformer that also converts the frequency. The use of high frequency further reduces the likelihood of serious injury due to electrical shock.

Figure 4:
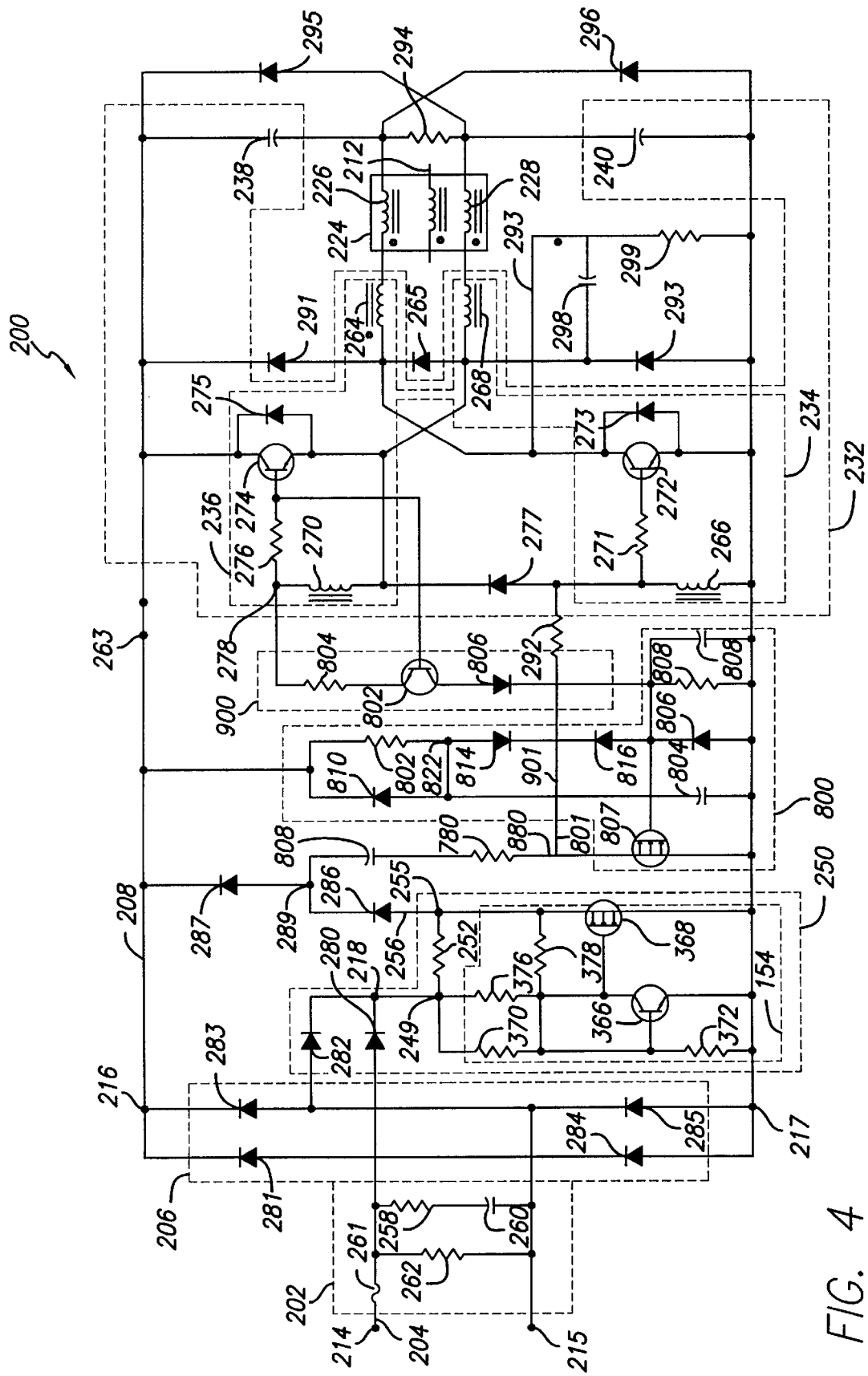
FIG. 4 is an electrical schematic of a detailed embodiment of an electronic isolation transformer configured according to the invention.

FIG. 4 is an electrical schematic of a detailed embodiment of an electronic isolation transformer 200 configured according to the invention. Electronic isolation transformer 200 provides lighting system 100 the flexibility to employ low-voltage halogen lamps in lighting fixture 108 and to use MO dimmer switches and RC dimmer switches to dim the halogen lamps.

Electronic isolation transformer 200 converts an AC signal 204 at a first frequency to an output signal 212 at a second frequency that is higher than the first frequency. AC signal 204 can be three-wire, grounded source of power 106 or an output signal of a dimmer switch. Output signal 212 can be the two-wire, ungrounded source of power provided to pool light 102. The frequency of the two-wire, ungrounded source of power can advantageously be chosen to reduce the passage of electrical current through water and the human body as compared to a household 60-Hz signal, thus further reducing the risk of serious injury due to electrical shock. For example, the frequency can be chosen to be between about 5,000 Hz to 20,000 Hz.

Electronic isolation transformer 200 comprises a filter circuit 202, a rectifier circuit 206, an isolation transformer 224, and an oscillator circuit 232.

Filter circuit 202 filters out undesired frequency components of AC signal 204. Filter circuit 202 is coupled across an input 214 of rectifier circuit 206. In the illustrated embodiment, filter circuit 202 is a low-pass filter that filters out high-frequency components of the AC signal before they reach rectifier circuit 206. For a household source of power, such high-frequency components can be caused by household appliances being turned ON and OFF, converters operating in desktop computers, and power surges on the main electrical lines supplying power to the house. By removing the unwanted high-frequency components, damage to the electrical components of electronic isolation transformer 200 can be prevented.

Filter circuit 202 particularly comprises a resistor 258 in series with a capacitor 260. The values of resistor 258 and capacitor 260 are chosen to remove the desired unwanted frequency components. In this embodiment, resistor 258 is chosen as 470 ohms and capacitor 260 is chosen as 1 microfarad for a cut-off frequency of about 3.4 kilohertz. Filter circuit 202 further includes a 4-amp fuse 261 in series with rectifier circuit 206 to protect electronic isolation transformer 200 against overcurrent conditions, such as, a fault or short circuit. Also, a varister 262 is coupled in parallel with series-connected resistor 258 and capacitor 260. Varister 162 suppresses overvoltage transients in AC signal 204, for example, beat transients exceeding 130 V.

Rectifier circuit 206 passes the positive valued portions, and rectifies the negative-valued portions, of AC signal 204 applied to input 214 to produce a first rectified signal 208 at an output 216. Rectifier circuit 106 typically comprises a full-wave bridge rectifier including diodes 281,283,284,285, which are model no. RL207.

Isolation transformer 224 and oscillator circuit 232 are coupled to first output 216 of rectifier circuit 232 in a half-bridge circuit arrangement.

Isolation transformer 224 steps down first rectified signal 208 applied to its primary windings to a voltage value less than the voltage value of first rectified signal 208. Isolation transformer 224 has a first primary winding 226, a second primary winding 228, and a secondary winding 230 for coupling a load thereto, such as, the lamps of the pool lights. Primary windings 226,228 and secondary winding 230 share the same core, and have a 39:9 winding ratio. Thus, first rectified signal 208 is stepped down to a lower-voltage output signal 212 across secondary winding 230.

Oscillator circuit 232 switches first rectified signal 208 between primary windings 226,228 to transform first rectified signal 208 into output signal 212 that has a second frequency that is greater than the first frequency. Oscillator circuit 232 includes switches 234,236 and capacitors 238, 240.

Switches 234,236 direct the application of first rectified signal 208 across primary windings 226,228. Switch 234 is coupled between a positive terminal (denoted by a dot on one side of the winding) of first primary winding 226 and an output node 217 of rectifier circuit 206. Switch 236 is coupled between first output 216 and a positive terminal of second primary winding 228. Electronic switches can be employed for switches 234,236.

In the particular embodiment shown in FIG. 4, switch 234 includes a transistor 272, a diode 273, a resistor 271, and a first transformer driving circuit having a first auxiliary winding 268 and a second auxiliary winding 266. Diode 273 is coupled across the collector and emitter of transistor 272 to protect it against overvoltages. Resistor 271 is coupled to the base of transistor 272 and the negative terminal of second auxiliary winding 266. The positive terminal of second auxiliary winding 266 is connected to output node 217. The negative terminal of first auxiliary winding 268 is coupled to the positive terminal of second primary winding 228.

Switch 236 includes a transistor 274, a diode 275, a resistor 276, and a second transformer driving circuit having a third auxiliary winding 264 and a fourth auxiliary winding 270. Diode 275 is coupled across the collector and emitter of transistor 274 to protect it against overvoltages. Resistor 276 is coupled to the base of transistor 274 and the positive terminal of fourth auxiliary winding 270. The negative terminal of fourth auxiliary winding 270 is connected to the negative terminal of second auxiliary winding 266 via a diode 277 and to the source of transistor 274. The negative terminal of third auxiliary winding 264 is coupled to the positive terminal of first primary winding 226, and the positive terminal of third auxiliary winding 264 is coupled to the drain of transistor 272. Finally, the positive terminal of first auxiliary winding 268 is coupled to the source of a transistor 274.

In this particular embodiment, transistors 272,274 are model no. MJE13009. Diodes 273,275 are model no. 1N4005. Auxiliary windings 264,266,268,270 share the same magnetic core, and the winding ratio is 5:1 for fourth auxiliary winding 270 and third auxiliary winding 264 and for second auxiliary winding 266 and first auxiliary winding 268.

To complete the half-bridge circuit arrangement, capacitor 238 is coupled between first output 216 and the negative terminal of first primary winding 226, and capacitor 240 is coupled between output node 217 and the negative terminal of second primary winding 228. In this particular embodiment, capacitors 238,240 are each 1 microFarad.

The operation of a typical half-bridge circuit is readily understood by a skilled artisan, and the operation of the half-bridge circuit as particularly illustrated in FIG. 4 can be readily understood from examination of the illustrated circuit. Accordingly, the operation of the circuit will be generally described herein.

First transformer driving circuit and second transformer driving circuit primarily control the turning OFF and ON of transistors 272,274 when electronic isolation transformer 200 is normally operating. Transistors 272,274 operate in opposing fashion, that is, when one is ON the other is OFF, and they alternately turn ON and OFF. When transistor 272 is ON and transistor 274 is OFF, the current path is from first output 216 through capacitor 238, first primary winding 226, third auxiliary winding 264, and transistor 272 to output node 217. Further, the charge on capacitor 240 can discharge through second primary winding 228, first auxiliary winding 268, a diode 265 coupled between the positive terminals of auxiliary windings 264,266, and transistor 272. The current through first auxiliary winding 268 causes a voltage across second auxiliary winding 266 to keep transistor 272 ON. Eventually the core saturates, causing the voltage across second auxiliary winding 266 to go to zero, which turns OFF transistor 272. The energy stored in the core, at this time, will reverse the voltage polarity on winding 270 and will turn ON transistor 274.

In opposing fashion, when transistor 272 is OFF and transistor 274 is ON, the current path is from first output 216 through transistor 274, first auxiliary winding 268, second primary winding 228, and capacitor 240 to output node 217. Further, capacitor 238 discharges through transistor 274, diode 265, third auxiliary winding 264, and first primary winding 226. The current through third auxiliary winding 264 causes a voltage across fourth auxiliary winding 270 to keep transistor 274 ON. Eventually the core saturates, causing the voltage across fourth auxiliary winding 270 to go to zero, which turns OFF transistor 274.

Accordingly, when a low-frequency sinusoidal AC signal 204 is applied to electronic isolation transformer 200, the waveform of output signal 212 is a series of alternating negative- and positive-valued pulses defined by an envelope with substantially the same shape but lesser amplitude as AC signal 204. That is, output signal 212 is a high-frequency signal defined by the switching speed with a modulating low-frequency signal imposed upon it.

In accordance with the present invention, electronic isolation transformer 200 further comprises a linear-load circuit 250, a no-load protection circuit 800, and a short-circuit protection circuit 900.

Linear-load circuit 250 presents a linear load and a conduction path to the dimmer switch when AC signal 204 is within a predetermined range. In particular, linear-load circuit 250 is responsive to AC signal 204 to couple itself across input 214 when AC signal 204 is within a predetermined range and to uncouple itself otherwise. The linear load is chosen to be within the power rating of the MO dimmer switch. Consequently, electronic isolation transformer 200 presents a linear load within the power rating of the MO dimmer switch, and provides a conduction path through linear-load circuit 250 for RC dimmer switches that require a conduction path for communications. Thus, MO dimmer switches and certain RC dimmer switches can be employed in lighting system 100.

Furthermore, linear-load circuit 250 is responsive to AC signal 204 to provide a first control signal 256, and oscillator circuit 232 is responsive to first control signal 256 to inhibit switching when AC signal 204 is within the predetermined range and to permit switching otherwise. The predetermined range is chosen to correspond at least to the time the RC dimmer switch communicates its dimming control signal. Accordingly, the combined oscillator circuit 232 and isolation transformer 224 will appear as a high-impedance open circuit, and the input impedance of electronic isolation transformer 200 will be that of the linear-load circuit 250 when AC signal 204 is within the predetermined range. Consequently, no high-frequency noise is generated on the power line by electronic isolation transformer 200 when the RC dimmer switch communicates its dimming control signal. Thus, RC dimmer switches that communicate over the power lines can be employed in lighting system 100.

As illustrated in the detailed embodiment shown in FIG. 4, linear-load circuit 250 comprises diodes 280,282, resistive load 252, and switch 254.

Diodes 280,282, in tandem with diodes 284,285, rectify AC signal 204 to produce a second rectified signal 209 at a second output 218 formed by the connection of diodes 280,282. Diode 280 is coupled between input 214 and second output 218, and diode 282 is coupled between a reference node 215 and second output 218. One of ordinary skill in the art will appreciate that linear-load circuit 250 can sense AC signal 204 directly or indirectly, for example, by sensing first rectified signal 208 or second rectified signal 209.

Resistive load 252 and switch 254 are coupled in series between second output 218 and output node 217. Switch 254 is responsive to AC signal 204 to close when the value of AC signal 204 is within the predetermined range, thus coupling resistive load 252 across input 214 via diodes 280,285 or diodes 282,284; and to open when the value of AC signal 204 is outside the predetermined range, thus uncoupling resistive load 252. In this particular embodiment, resistive load 252 is 180 ohms, which is approximately the load of a 80-W incandescent lamp.

Switch 254 particularly comprises transistors 366,368 and biasing resistors 370,372,376,378. Transistor 368 operates to couple resistive load 252 across input 214 and to uncouple resistive load 252. Furthermore, the state of transistor 368 will determine the value of first control signal 256.

Resistors 370,372,376,378 bias transistors 366,368. Resistor 370 is coupled between second output 218 and the base of transistor 366. Resistor 372 is coupled between the base of transistor 366 and output node 217. Resistor 376 is coupled between second output 218 and the collector of transistor 366 and also the gate of transistor 368. The emitter of transistor 366 is coupled to output node 217. Resistive load 252 is coupled between second output 218 and the drain of transistor 368. Resistor 378 is coupled between the base of transistor 366 and the drain of transistor 368. The gate of transistor 368 is coupled to the collector of transistor 366, and the source of transistor 368 is coupled to output node 217.

In this particular embodiment, resistors 370,372,376,378 are 820 kilo-ohms, 22 kilo-ohms, 220 kilo-ohms, and 820 kilo-ohms, respectively. Transistor 366 is model no. 2N3904 and transistor 368 is model no. BS107A.

Electronic isolation transformer 200 further comprises a transconductance circuit that is an electrical path to oscillator circuit 232 for first control signal 256. The transconductance circuit comprises the series connection of a diode 286, a capacitor 288, a resistor 290, and a resistor 292. Diode 286 is coupled with the drain of transistor 368 to form a node 255; and diode 287 is coupled between first output 216 and a node 289 formed by the connection of diode 286 and capacitor 288. In this particular embodiment, resistors 290, 292 are 1 kilo-ohms and 47 ohms, respectively; capacitor 288 is 15 nanoFarads; and diode 286 is model no. 1N4005.

Figure 5:
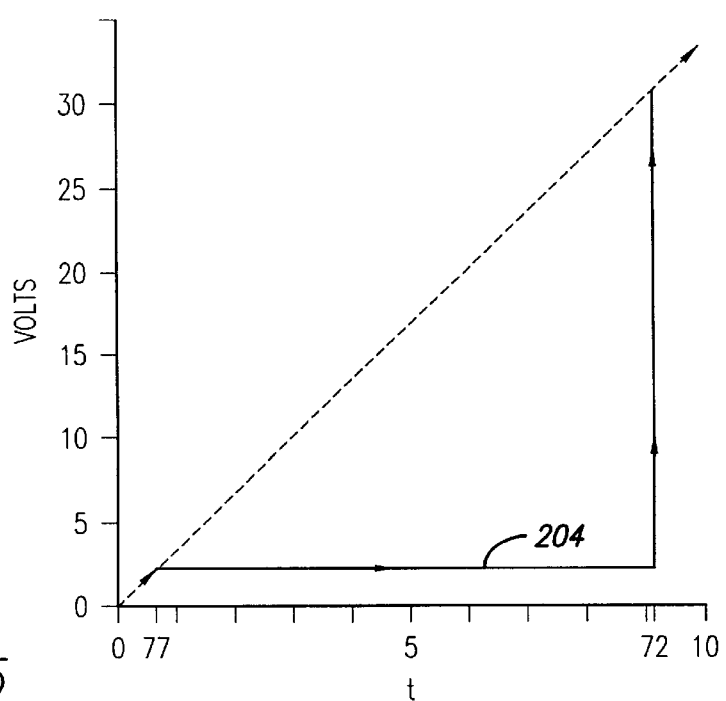
FIG. 5 is a plot of a portion of an AC signal supplied by a two-wire dimmer switch connected the electronic isolation transformer shown in FIG. 4.

The operation of linear-load circuit 250 and the half-bridge circuit arrangement constructed as described above will now be described with reference to FIG. 5, which is a plot of a portion of AC signal 204 supplied by a two-wire dimmer switch connected to input 214 after a zero crossing.

In general terms, switch 254 acts as a latching switch that, when closed, stays closed until an event causes it to open. Switch 254 closes upon AC signal 204 reaching a lower limit of the predetermined range and opens upon AC signal 204 reaching an upper limit of the predetermined range. In FIG. 5, the lower limit is the voltage at t=T1, and the upper limit is the voltage at t=T2.

AC signal 204 crosses zero at t=0. Correspondingly, first rectified signal 208 is zero, the drain-to-source voltage of the electronic switches of oscillator circuit 232 are unbiased, oscillator circuit 232 is not oscillating, and no voltage appears across secondary winding 230. Thus, oscillator circuit 232 appears as a high-impedance open circuit.

Furthermore, second rectified signal 209 is zero, transistors 366,368 are unbiased, and resistive load 252 is uncoupled from across input 214. Consequently, electronic isolation transformer 200 appears as a high-impedance open-circuit to the dimmer switch. This impedance is of no consequence to the dimmer switch because, as described below, it exists for a relatively short duration.

As AC signal 204 increases positively from t=0, the full voltage of AC signal 204 appears across diode 280 and the gate and drain-to-source of transistors 366,368. Furthermore, first rectified signal 208 begins to charge capacitors 238,240 through resistor 294, thus preparing oscillator circuit 232 for its switching operation.

Eventually, AC signal 204 will increase to a point that forward biases diode 280 and biases transistor 368 to turn ON. For the particular transistor models and values of resistors in this illustrated embodiment, this point occurs at a lower limit of about 2 V at T1 equals 46 microseconds, which is before the communication of the dimming control signal.

While transistor 368 is ON, resistive load 252 is coupled across input 214. A current path then exists for AC signal 204 through input 214 to reference node 215 via diode 280, resistive load 252, transistor 368, and diode 285. Thus, linear load circuit 250 provides a linear load within the power rating of a MO dimmer switch and a conduction path for communications of a RC dimmer switch.

Moreover, while transistor 368 is ON, node 255 is coupled to reference node 215 via diode 285. Thus the voltage of first control signal 256 is insufficient to bias the base-to-emitter voltage of transistors 272,274. Accordingly, oscillator circuit 232 is inhibited from oscillating although it is prepared to do such. Thus electronic isolation transformer 200 does not generate any switching noise that could interfere with the communications of the RC dimmer switch. Further, no currents are flowing in primary windings 226, 228 at this time, thus the combined oscillator circuit 232 and isolation transformer 224 appears as a high-impedance open circuit. Consequently, the input impedance of electronic isolation transformer 200 presented to the dimmer switch will be a linear load defined by resistive load 252.

Further, the household voltage is divided between resistive load 252 and a highly resistive element of the dimmer switch. Because the resistance of the highly resistive element is much greater than the resistance of resistive load 252, most of the voltage of the household signal appears across the dimmer switch, and only a small fraction appears across resistive load 252. In FIG. 5, the dotted line represents the household signal applied to the input of the dimmer switch. At these short time periods (represented in angular degrees), the sinusoidal AC signal 204 appears linear. The solid line represents AC signal 204 that appears across resistive load 252. In this particular embodiment, the voltage across resistive load 252 is limited to a maximum of about 5 V.

The maximum 5 V is insufficient to turn ON transistor 366, which, in this particular embodiment, requires a biasing voltage of 27 V at second output 218. Thus, once transistor 368 turns ON it will stay ON until an event occurs that causes the voltage at second output 218 to exceed 27 V.

The event, when a dimmer switch is employed, is the dimmer switch "firing" at t=T2. When the dimmer switch fires, its impedance drops to a very low value. Accordingly, substantially the full voltage of the household signal is applied suddenly to second output 218 and appears across resistive load 252. In this particular embodiment, the voltage of AC signal 204 when the dimmer switch fires at t=T2 is 30 V. Consequently, transistor 366 turns ON. A skilled artisan will recognize that the maximum limit of the predetermined range is dependent upon the setting of the dimmer switch and its firing angle. If no dimmer switch is employed, the event is household signal reaching 27 V.

The dimmer switch does not fire until after the reception of the dimming control signal. Thus, resistive load 252 provides a linear load within the power rating of a MO dimmer switch and a conduction path for communications of a RC dimmer switch during the predetermined period.

In response to transistor 366 turning ON, transistor 368 turns OFF because its gate is now coupled to output node 217 via transistor 366. Accordingly, resistive load 252 is no longer coupled to output node 217 or across input 214. Uncoupling resistive load 252 prevents it from continuing to dissipate heat. This is an important feature because, as described below, electronic isolation transformer 200 can be housed in a plastic junction box that has limited heat transfer capabilities.

With resistive load 252 uncoupled, second rectified signal 209 is applied to the gates of transistors 272,273 via the transconductance circuit. Capacitor 288 absorbs AC signal 204 when it is suddenly applied to the transconductance circuit at t=T2. The charge on capacitor 288 can later discharge through diode 287 upon a zero crossing of first rectified signal 208.

Applying second rectified signal 209 to transistors 272, 273 permits oscillator circuit 232 to switch. First rectified signal 208 and the charge on capacitors 238,240 provide the driving voltage for transistors 272,273. Oscillator circuit 232 switches first rectified signal 208 between primary windings 226,228 to transform first rectified signal 208 into output signal 212 that has a second frequency that is greater than the first frequency. Thus, after t=T2, the load on the dimmer switch will be the load on secondary winding 230, which is lamps 136 of pool light 102.

In another aspect of the invention, electronic isolation transformer 200 further comprises a resistor 294 that dampens the LC network formed by the RC dimmer switch and the half-bridge circuit arrangement. Resistor 294 is coupled between the negative terminal of primary windings 226,228.

When oscillator circuit 232 begins switching, the input impedance of electronic isolation transformer 200 is the load of the lamps and, connected in parallel to the load of the lamps, a series-connected capacitor 238 and capacitor 240. In series with this input impedance is the inductance of the dimmer switch and the inductance of the wires connecting the dimmer switch to electronic isolation transformer 200. Typically, when the load of the lamps is at rated load of electronic isolation transformer 200, the load of the lamps is sufficient to dampen the oscillations created by the LC network when the dimmer switch fires and AC signal 204 increases dramatically at t=T2.

If multiple lamps are connected to electronic isolation transformer 200, for example, three 50-watt (W) lamps connected to a rated 150-W dimmer switch, and one lamp burns out, then the load of the lamps drops to 100 W. This decreased load may not be a sufficient to effectively dampen the oscillations of the LC network. Consequently, the oscillations are fed back to the dimmer switch causing a triac in the dimmer switch to fire erratically as it experiences abnormal zero crossings, and are fed back to transistors 272,274 causing them to turn ON and OFF erratically. In turn, the remaining connected lamps flicker noticeably, and a buzzing noise is heard in the pool lights.

With the addition of resistor 294, the input impedance of electronic isolation transformer 200 is the load of the lamps and, connected in parallel to the load of the lamps, a series connected capacitor 238, capacitor 240, and resistor 294. Thus resistor 294 provides the additional dampening that is required when a lamp burns out. In this particular embodiment, resistor 294 is selected as 39 ohms.

Electronic isolation transformer 200 further comprises diodes 295,296 for protecting capacitors 238,240 against overvoltages when halogen lamps are the load on secondary winding 230. When cold, halogen lamps have approximately one-tenth the resistance of an incandescent lamp, and approximate a short circuit across secondary winding 230. Thus, when the pool lights are initially turned on, and switching commences, transistor 274 turns ON and capacitor 240 will charge quickly because of the high current flowing in second primary winding 228 due to the approximate short circuit on secondary winding 230. Even after transistor 274 turns OFF, because of the inductive nature of second primary winding 228, current continues to flow in second primary winding 228 and capacitor 240 continues to charge.

The continued charging of capacitor 240 will cause the voltage on capacitor 240 to exceed the voltage on first output 216. When the voltage on capacitor 240 approximately equals the voltage on first output 216, diode 295, which is coupled between first output 216 and the negative terminal of second primary winding 228, diode 295 begins to conduct. Consequently, the current in second primary winding 228 flows through diode 295 rather than to capacitor 240, thus limiting the voltage across capacitor 240.

Diode 296, which is coupled between the negative terminal of first primary winding 226 and output node 217, operates similarly for capacitor 238. In this particular embodiment, diodes 295,296 are model no. 1N4005.

Electronic isolation transformer 200 further comprises a capacitor 297, a capacitor 298, and a resistor 299. These components provide a path for the current in primary windings 226,228 to flow after switches 272,274 turn OFF. For example, when transistor 272 is ON, the current flowing in first primary winding 226 has a path through transistor 272. When transistor 272 turns OFF, because of the inductive nature of first primary winding 226, it maintains the flow of current. This current can flow through capacitor 297 and resistor 299. Capacitor 298 and resistor 299 perform a similar function for the current flowing in second primary winding 228 when transistor 274 turns OFF.

Electronic isolation transformer 200 further comprises diodes 291,293. Diodes 265,291,293 are coupled in series between first output 216 and output node 217 to protect the half-bridge circuit arrangement from negative-valued transient voltages when transistors 272, 274 switch.

No-load protection circuit 800 will now be described.

No-load protection circuit 800 responds to a voltage generated by oscillator circuit 232 to stop the generation of output signal 212 when there is no load on electronic isolation transformer 200. In particular, no-load protection circuit 800 provides a second control signal 801 to oscillator circuit 232 to inhibit switching when the voltage is greater than a first predetermined threshold and to permit switching otherwise. Accordingly, output signal 212 is not generated when there is no load on the electronic isolation transformer, thus reducing the risk of electrical shock when a single burned-out lamp coupled to the electronic isolation transformer is serviced. Furthermore, electronic isolation transformer 200 can be reset by clearing the no-load condition and shutting off the power to electronic isolation transformer 200.

No-load protection circuit 800 comprises a transistor 802, capacitors 804,818, diodes 806,810,814,816 and resistors 808,812. The drain of transistor 802 is coupled to a node 820 formed by the connection of resistors 290,292, and the source of transistor 802 is coupled with output node 217. Diode 806, resistor 808, and capacitor 818 are coupled in parallel between the gate of transistor 802 and output node 217. Resistor 812 and capacitor 804 are coupled in series between first output 216 and output node 217. Diode 810 is coupled in parallel to resistor 812 to form a node 822 at one end; and diodes 814,816 are coupled in series between node 822 and the gate of transistor 802.

In this particular embodiment, transistor 802 is model no. BS170; diodes 806,816 are model no. 1N759A; diode 810 is model no. 1N4005; diode 814 is model no. 1N4145; resistors 808,812 are 1 mega-ohm and 3.3 mega-ohm, respectively; and capacitors 804,818 are each 1 microfarad.

The operation of no-load protection circuit 800 constructed as described above will be now be described.

During normal switching with a load connected to secondary winding 230, first rectified signal 208 is applied across no-load protection circuit 800. Thus, capacitor 804 charges through resistor 812 when first rectified signal 208 is positive valued, and capacitor 804 can reach a maximum voltage of less than 10 V in this particular embodiment. Furthermore, capacitor 804 can discharge through diode 810 when first rectified signal 208 is less than the voltage on capacitor 804, for example, during a zero crossing of AC signal 204.

If a no-load condition occurs on secondary winding 230, for example, the single lamp connected to secondary winding 230 burns out or the thermostat in lighting fixture 108 trips, no current flows through secondary winding 230 and, correspondingly, no appreciable current flows through primary windings 226,228. Thus, there is no path for the charge on capacitors 238,240 to discharge during normal switching operation. Accordingly, capacitors 238,240 charge and stay at their normal operating voltage to the maximum voltage of first rectified signal 208, which is about 170 V.

No-load protection circuit 800 is responsive to this overvoltage generated by oscillator circuit 232 during the no-load condition. The voltage on capacitors 238,240 appears across resistor 812 and capacitor 804, and, when the voltage on capacitors 238,240 reaches a first predetermined threshold, capacitor 804 charges to 10 V. When capacitor 804 reaches 10 V, diodes 814,816 begin to conduct, and capacitor 818 begins to charge. To protect capacitor 818, the voltage across capacitor 818 is limited by diode 806, which begins to conduct before capacitor 818 reaches a harmful voltage.

Eventually, capacitor 818 charges to a value that causes transistor 802 to turn ON, thus connecting node 820 to output node 217. The connection of node 820 to output node 217 provides a second control signal to oscillator circuit 232 via resistor 292 to bias transistor 272 to turn OFF. In particular, resistor 292 is coupled in parallel to second auxiliary winding 266, which provides a path for the current in second auxiliary winding 266. With the current in second auxiliary winding 266 being siphoned off to resistor 292, there is insufficient current to turn ON transistor 272. Thus, no voltage is generated across secondary winding 230, and no output signal 212 is supplied to the connected pool light.

This no-load protection feature is especially advantageous when the person who replaces the lamp forgets to turn off power to the pool light before servicing the burned-out lamp. Because there is no output signal 212, there is no risk of shock.

As long as AC signal 204 is supplied to electronic isolation transformer 200, transistor 802 will remain ON and no output signal 212 will be supplied. To reset electronic isolation transformer 200, the power supplied to electronic isolation transformer 200 must be shut off. Without power supplied to electronic isolation transformer 200, the charge on capacitor 818 can discharge through resistor 808, thus turning OFF transistor 802 to reset no-load protection circuit 800. If the no-load condition persists after power is re-applied to electronic isolation transformer 200, electronic isolation transformer 200 will shut off again.

Short-circuit protection circuit 900 will now be described.

Short-circuit protection circuit 900 stops the generation of output signal 212 when there is a short circuit (or fault)

condition on the load side of electronic isolation transformer 200. In particular, short-circuit protection circuit 900 is responsive to a current flowing in a one of primary windings 226,228 to provide a third control signal 901 to oscillator circuit 232 to inhibit switching when the current is greater than a second predetermined threshold and to permit switching otherwise. Accordingly, no output signal 212 is generated when there is a short-circuit across the output of electronic isolation transformer 200. Thus, the risk of shock and damage to electronic isolation transformer components due to shorts is reduced, and the electronic isolation transformer can be reset without having to replace parts, such as, fuses, which are conventionally used for short-circuit protection.

Short-circuit protection circuit 900 includes a transistor 902, a resistor 904, and a diode 906. Transistor 902 turns ON when excess current is flowing in first primary winding 226 due to a short-circuit condition.

Resistor 904 is coupled between the emitter of transistor 902 and a node 278 formed by the connection of fourth auxiliary winding 270 and resistor 276. Diode 906 is coupled between the collector of diode 906 and to capacitor 818. The base of transistor 902 is coupled to the gate of transistor 274. In this particular embodiment, transistor 902 is model no. MPSA92; and diode 906 is model no. 1N4148.

The operation of short-circuit protection circuit 900 constructed as described above will be now be described.

When a short-circuit condition occurs, the current in primary winding 226 will increase due to the drop in resistance. The excess current in first primary winding 226 will be reflected in fourth auxiliary winding 270. As the current entering the base of transistor 274 is increasing, the excess current will bias transistor 902 to turn ON, and the excess current will begin to charge capacitor 818. The voltage across capacitor 818 will increase causing transistor 802 to turn ON, thus connecting node 820 to output node 217.

The connection of node 820 to output node 217 provides a third control signal 901 to oscillator circuit 232 via resistor 292 to bias transistor 272 to turn OFF, thus inhibiting switching. Thus no voltage is generated across secondary winding 230, and no output signal 212 is supplied to the short-circuit condition. Thus the risk of electrical shock from the fault condition is reduced. Furthermore, the components of electronic isolation transformer 200 are protected from the high currents generated during a fault condition.

As long as AC signal 204 is supplied to electronic isolation transformer 200, capacitor 818 retains its charge, and therefore transistor 802 will remain ON. To reset no-load protection circuit 800, the power supplied to electronic isolation transformer 200 must be shut off. Without power supplied to electronic isolation transformer 200, the charge on capacitor 818 can discharge through resistor 808, thus turning OFF transistor 802 and resetting short-circuit protection circuit 900. If the short-circuit condition persists after power is re-applied to electronic isolation transformer 200, electronic isolation transformer 200 will shut off again.

Junction box 600 will now be described with particular reference to FIG. 6, which is an exploded top, front, and right-side perspective view of a junction box configured according to the invention.

Junction box 600 has no conductive components that can be energized and it physically isolates the three-wire, grounded source of power from the two-wire, ungrounded source of power. Junction box 600 consists of nonconductive material and has three separate, adjacent, integrally formed compartments. The three compartments are arranged as a first compartment, a second compartment, and a third compartment between the first compartment and the second compartment The third compartment is configured to house isolation transformer circuit 104; the second compartment is configured to convey the two-wire, ungrounded source of power from isolation transformer circuit 104 to lighting fixture 108; and the first compartment is configured to convey three-wire, grounded source of power 106 to isolation transformer circuit 104.

By eliminating metallic components and physically isolating the two power sources, the risk of electrical shock is further reduced. Furthermore, integrating electronic isolation transformer 200 with junction box 600, which is typically located close to the pool, makes it feasible to use low-voltage lamps in lighting fixture 108. That is, a long run of cord cannot be used with a low-voltage power source because of the voltage drop across the cord would be too great, not leaving enough voltage at lamps 136 to power them adequately. Thus, housing electronic isolation transformer 200 in the electrical panel, which is usually far from the pool near the residence, would require lengths of cord that can make it inefficient to power low-voltage lamps. By placing electronic isolation transformer 200 near the pool in junction box 600, the cord lengths are greatly reduced, enough to power the low-voltage lamps.

Figure 6:
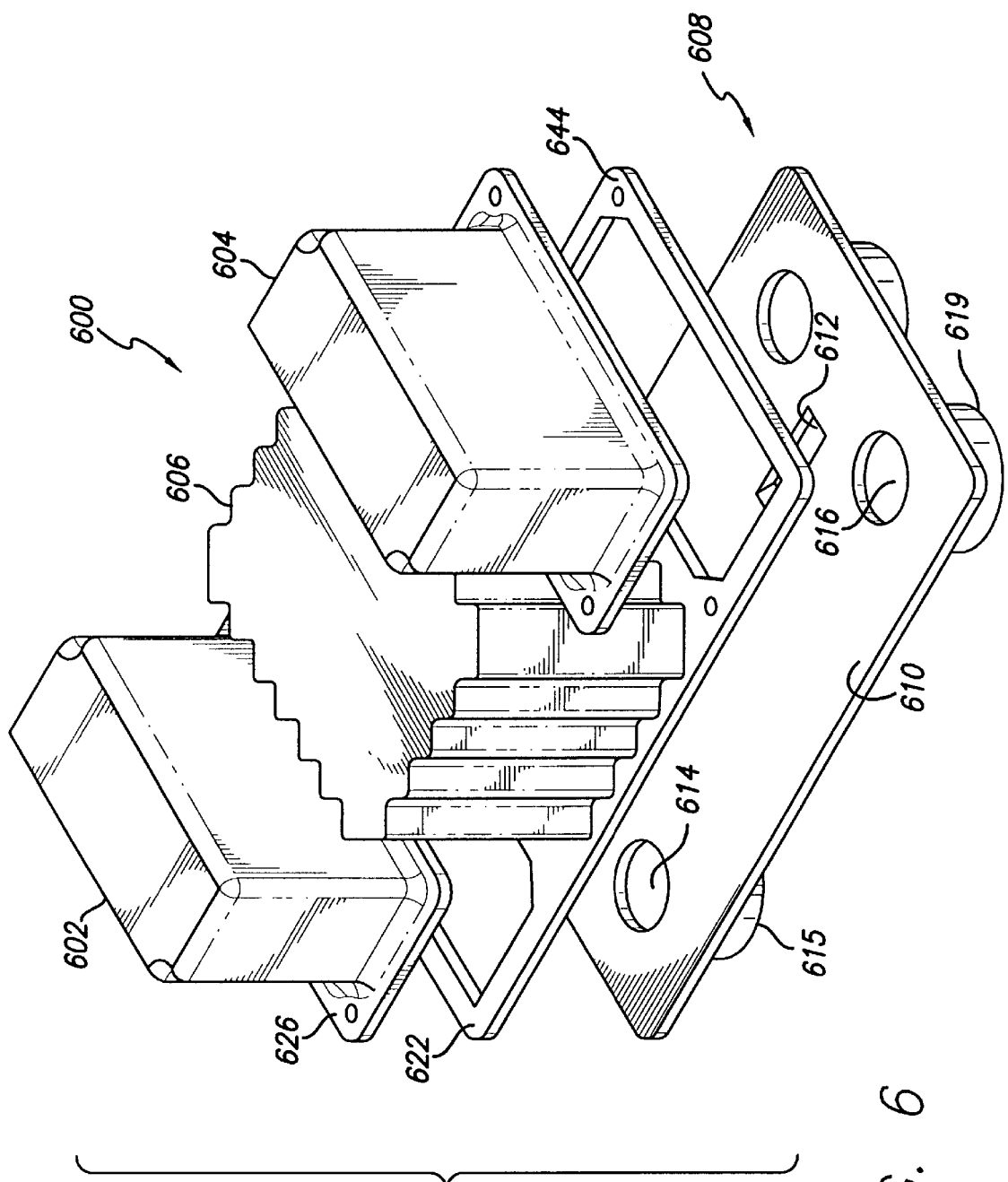
FIG. 6 is an exploded top, front, and right-side perspective view of a junction box configured according to the invention.

Referring to FIG. 6, junction box 600 comprises a first cap 602, a second cap 604, a third cap 606, and a platform 608.

Platform 608 is formed of one-piece plastic material, such as, polyvinyl chloride (PVC) or the like, and has a planar upper surface 610 with channels 612 formed in the top of upper surface 610 and apertures 614,616 formed throughout platform 608 near the corners of planar upper surface 610. Platform 608 has tubes 618 extending from the bottom surface of platform 608 that surround apertures 614,616. Another tube (not shown) extends from the bottom in the middle of upper surface 610, but there is no corresponding aperture. Further, rectangular ribs 620 (not shown) extend from the bottom surface and connect tubes 618 to reinforce platform 608 and tubes 618.

Wires associated with three-wire, grounded source of power 106 can be routed through tubes 618 and apertures 614; and conduit associated with three-wire, grounded source of power 106 can be affixed to tubes 618. Similarly, wires associated with the two-wire, ungrounded source of power can be routed through tubes 619 and apertures 616; and conduit 114 associated with two-wire, ungrounded source of power can be affixed to tubes 619. The center tube can receive an end of a pole, which can support junction box 600.

Channels 612 provide a path for leads extending from the high-voltage side of isolation transformer circuit 104 housed in the third compartment to the first compartment, and for leads extending from the low-voltage side of isolation transformer circuit 104 housed in the third compartment to the third compartment.

Third cap 606 is formed of one-piece of plastic material, such as, polycarbonate, and has a substantially rectangular, hollow main body having corrugated exterior sides, a closed top surface, and a bottom opening. Flanges 622,644 extend from the open bottom of third cap 606. Each flange 622,624 has a rectangular opening conforming to the perimeter of platform 608 that allows wires to ingress from apertures 614,616 into the first compartment and the second compartment, respectively.

Isolation transformer circuit 104 is suspended in the interior of third cap 606 by filling the interior with an electrically nonconductive, heat-conductive epoxy. The heat generated by isolation transformer circuit 104 is conducted by the epoxy and is transferred to third cap 606. The corrugated sides aid in dissipating the heat into the surrounding air. Electronic isolation transformer 200 is very efficient, dissipating less heat than conventional isolation transformers. Its efficiency makes it practical to house electronic isolation transformer 200 in a plastic junction box.

Electronic isolation transformer 200 includes a thermostat 263, (see FIG. 4), that uncouples the combined oscillator circuit 232 and isolation transformer 224 when the temperature surrounding thermostat 263 exceeds a predetermined threshold. Thus, electronic isolation transformer 200 is protected from overheating.

First cap 602 is formed of one-piece of plastic material, such as, polycarbonate, and has a substantially rectangular, hollow main body, a closed top surface, and an open bottom. A flange 626 extends from the bottom around the perimeter of the open bottom. Flange 626 conforms to the shape of flange 622 and its rectangular opening. Flange 626, flange 622, and platform 608 have holes for receiving a fastener that fastens the flanges to platform 608.

The structure of second cap 604 is similar to first cap 602.

The first compartment is defined by the interior of first cap 602 and upper surface 610. The first compartment is configured to receive three-wire, grounded source of power 106, and the wires from three-wire, grounded source of power 106 can be connected to the high-voltage leads from isolation transformer circuit 104. The second compartment is defined by the interior of second cap 604 and upper surface 610. The second compartment is configured to receive a one end of current-carrying circuit 112, and the wires of current-carrying circuit 112 can be connected to the low-voltage leads from isolation transformer circuit 104. The third compartment is defined by the interior of third cap 606 and upper surface 610.

Repairs and connections to the cords running to either the first compartment and the second compartment can be made by removing one of the caps 602,604. While one cap is removed, the other cap can remain affixed. Thus, a repairman repairing the contents of one of the compartments is not exposed to the contents of the other compartment. The physical isolation provided by the compartments further reduces the risk of serious injury due to electrical shock. A defective electronic isolation transformer 200 can be replaced by replacing third cap 606 along with the suspended defective electronic isolation transformer.

Forming junction box 600 entirely of nonconductive material eliminates the possibility that it can become energized, thus further reducing the risk of serious injury due to electrical shock In conclusion, the lighting system described herein is easier to install, improves lighting characteristics, and can employ MO dimmer switches and inexpensive RC dimmer switches to dim halogen lamps without compromising safety. This is primarily accomplished by eliminating the conductive components of the lighting fixture and the niche; eliminating ground connections and bond connections from the niche; securing the lighting fixture to the niche with snap fasteners; arranging sockets to radiate multiple light beams in different directions; presenting a linear load to the MO dimmer switch and a conduction path to the RC dimmer switch; inhibiting switching in the electronic isolation transformer when the RC dimmer switch communicates its dimming control signal; eliminating the conductive components of the junction box; physically isolating the high-voltage, low-frequency power source from the low-voltage, high-frequency power source in the junction box; and housing the electronic isolation transformer in the junction box.

Those skilled in the art will recognize that various modifications and variations can be made in the lighting system and apparatus of the present invention and in construction and operation of this lighting system and apparatus without departing from the scope or spirit of this invention.

What is claimed is:

1. A pool light comprising:

a niche, including a forming shell; and a lighting fixture for mounting in the niche, including:
    a housing having at least one first mounting location; and
    a lens having:
        a front face;
        at least one first snap fastener configured to releasably engage the at least one first mounting location to secure the lens to the housing; and
        at least one second snap fastener configured to releasably engage at least one second mounting location on the niche to secure the lighting fixture to the niche, wherein the at least one second snap fastener and lens are formed as an integral one-piece unit, and wherein the at least one second snap fastener includes:
            at least one elongated member extending rearward, wherein the at least one elongated member includes a first elongated member and a second elongated member; and
            a tab at an end of the elongated member distal the front face, wherein the at least one second mounting location each include at least one indentation formed in an inner surface of the forming shell, the at least one indentation having a first indentation and a second indentation at predetermined locations on the inner surface of the forming shell, wherein the first elongated member and the second elongated member are of unequal lengths corresponding to the locations of the first indentation and the second indentation.

2. A lighting fixture for mounting in a niche, the lighting fixture comprising:

a housing having at least one first mounting location; and a lens having:
    a front face;
    at least one first snap fastener configured to releasably engage the at least one first mounting location to secure the lens to the housing; and
    at least one second snap fastener configured to releasably engage a second mounting location on a forming shell included in the niche to secure the lighting fixture to the niche, wherein the at least one second snap fastener includes:
        at least one elongated member extending rearward; and
        a tab at an end of the elongated member distal the front face, wherein the at least one second mounting location each include at least one indentation formed in an inner surface of the forming shell, wherein the at least one indentation includes a first indentation and a second indentation at predetermined locations on the inner surface of the forming shell, wherein the at least one elongated member includes a first elongated member and a second elongated member, the first elongated member and the second elongated member are of unequal lengths corresponding to the locations of the first indentation and the second indentation.

* * * * *